United States Patent
Park et al.

(10) Patent No.: US 6,717,646 B1
(45) Date of Patent: Apr. 6, 2004

(54) ALIGNMENT INDICATORS FOR LIQUID CRYSTAL DISPLAY

(75) Inventors: Kwang-Seop Park, Kumi-shi (KR); In-Jae Chung, Kumi-shi (JP)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/467,301

(22) Filed: Dec. 17, 1999

(30) Foreign Application Priority Data

Dec. 21, 1998 (KR) .......................................... 98-56784

(51) Int. Cl.[7] ........................................... G02F 1/1333
(52) U.S. Cl. ..................................................... 349/158
(58) Field of Search ................................. 349/110, 158, 349/160, 187

(56) References Cited

U.S. PATENT DOCUMENTS 5,771,085 A * 6/1998 Ochi et al. .................. 349/158
5,936,695 A * 8/1999 Hida et al. .................. 349/153

* cited by examiner

*Primary Examiner*—Toan Ton
*Assistant Examiner*—Tai Duong
(74) *Attorney, Agent, or Firm*—Birch, Stewart, Kolasch & Birch, LLP

(57) ABSTRACT

Alignment indicators for an LCD device are used for determining misalignment when assembling two LCD substrates together, where a lower substrate includes an array of thin film transistors and an upper substrate includes a color filter array. A first alignment indicator is defined on a first substrate, and a second alignment indicator defined on a second substrate, wherein recessed portions with various depths and protruded portions with various lengths are defined at the outer edges of the second alignment indicator so that the amount of misalignment can be accurately measured by reading the position of the recessed portions and the protruded portions relative to the first alignment indicator when the upper and lower substrates are put together.

29 Claims, 2 Drawing Sheets

ALIGNMENT INDICATORS FOR LIQUID CRYSTAL DISPLAY

BACKGROUND OF THE INVENTION

1. Field of the Invention

The present invention relates to alignment indicators for a liquid crystal display (LCD). The alignment indicators are used to examine the alignment of the lower and upper substrates of an LCD device when the substrates are assembled together. Generally, the lower substrate is provided with an array of thin film transistors and the upper substrate is provided with a black matrix for a color filter.

2. Discussion of the Related Art

In general, the manufacture of an LCD device involves the steps of providing a lower substrate including an array of thin film transistors (TFTs), providing an upper substrate including a black matrix for defining a color filter, assembling the upper and lower substrates together, injecting liquid crystals between the assembled substrates, attaching a polarizing substrate on the outside surfaces of the assembled substrates, performing module processing, and other steps.

Alignment indicators for an LCD device are used to determine and check the accuracy of alignment between the upper and lower substrates when they are assembled together. Referring to FIG. 1, an alignment indicator of an LCD device is defined by providing alignment indicators 3 and 4 usually located at the corner edges of the upper substrate 2 and the lower substrate 1. The misalignment of the two substrates is indicated by the alignment indicators if the upper and lower alignment indicators overlap with each other or the spacing between the alignment marks are uneven when the upper substrate 2 and the lower substrate 1 are assembled together.

Generally, the alignment indicator 4, which is made of a substance similar to that of the gate or source/drain electrode, is defined at a corner edge of the lower substrate 1 when a pixel array consisting of TFTs and pixel electrodes are defined. The alignment indicator 3, which is made of a substance similar to that of a black matrix for defining a color filter, is defined at a corner edge of the upper substrate 2 so that the alignment indicators 4 and 3 are located across from each other when the upper substrate 2 and the lower substrate 1 are assembled together.

FIG. 2 shows alignment indicator 21 of the lower substrate and alignment indicator 22 of the upper substrate of a LCD when the upper substrate 2 and the lower substrate 1 are assembled together. The alignment indicator 21 of the lower substrate has a cross-like shape having a predetermined width. The alignment indicator 22 of the upper substrate has four L-shaped members arranged in such a manner that the alignment indicator 21 can be placed in the middle of the four L-shaped members when the upper and lower substrates 1 and 2 are assembled together, as shown in FIG. 2.

When the upper and lower substrates are put together, the alignment indicator 21 of the lower substrate is across from the L-shaped members of the alignment indicator 22 of the upper substrate. If the substrates are put together without any misalignment, the alignment indicators 22 and 21 of the upper and lower substrates should not overlap with each other and should have equal spacing between the edges the four L-shaped members of the alignment indicator 22 and the cross shaped figure of alignment indicator 21, as shown in FIG. 2.

Unfortunately, the amount of misalignment between the upper and lower substrate as shown by the alignment indicators of the related art can only be guessed at by a visual inspection. Thus, it is very difficult to accurately calculate the misalignment of the upper and lower substrates, which makes it difficult to properly align the subsequent substrates for manufacture of other LCDs in the assembly line.

SUMMARY OF THE INVENTION

To overcome the problems described above, preferred embodiments of the present invention provide alignment indicators for an LCD device that achieves accurate measurement of the misalignment when the upper and lower substrates of a LCD are assembled together so that subsequent LCDs that are to be manufactured have properly aligned lower and upper substrates.

A preferred embodiment of the present invention includes a first substrate, a second substrate, a first alignment indicating member provided on the first substrate, and a second alignment indicating member including a measuring member provided on the second substrate, wherein the first and second alignment indicating members are arranged such that an amount of misalignment can be measured by a position of the measuring member relative to the first alignment indicating member when the first substrate and the second substrate are assembled together.

Another preferred embodiment of the present invention includes a first substrate, a second substrate, a first alignment indicating member on the first substrate, and a second alignment indicating member on the second substrate, the second alignment indicating member including at least one of a plurality of recessed portions having various depths and a plurality of protruded portions having various lengths, wherein the recessed portions and protruded portions are defined at an edge of the second alignment indicating member, and wherein the relative position of the recessed portions and the protruded portions with respect to the first alignment indicating member provides a measurement of an amount of misalignment between the first substrate and the second substrate when the first and second substrates are assembled together.

Therefore, preferred embodiments of the present invention have the advantages of providing alignment indicators that allow for accurate measurement of the misalignment between an upper and lower substrates of a LCD for proper alignment of subsequent LCDs.

Other details, features, elements and. advantages of the present invention will be described in detail below with reference to preferred embodiments of the present invention and the attached drawings.

BRIEF DESCRIPTION OF THE ATTACHED DRAWINGS

The present invention will become more fully understood from the detailed description given herein below and the accompanying drawings which are given by way of illustration only, and thus do not limit the present invention and wherein.

DETAILED DESCRIPTION OF PREFERRED EMBODIMENTS

Figure 1:
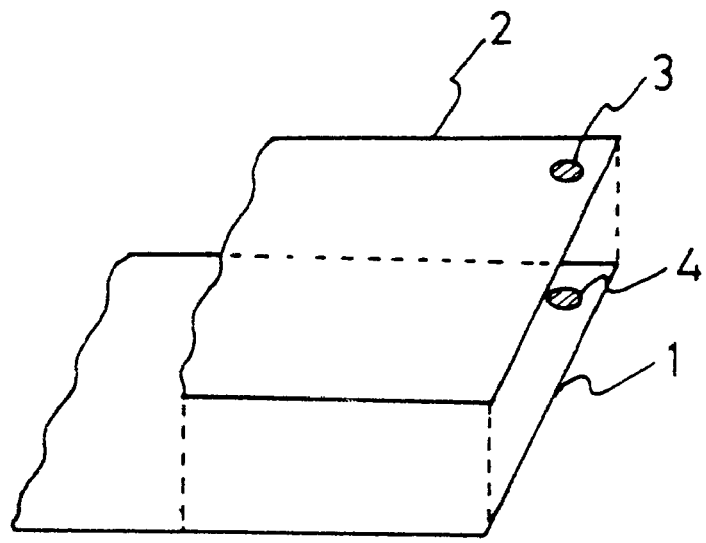
FIG. 1 shows the locations of the alignment indicators of the related art when the lower and upper substrates of a LCD are assembled together.
Figure 2:
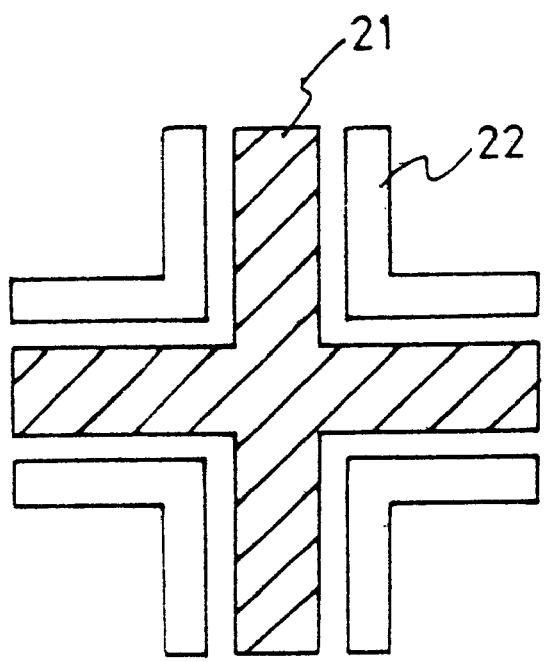
FIG. 2 shows the shapes of the alignment indicators for a LCD according to the related art.
Figure 3:
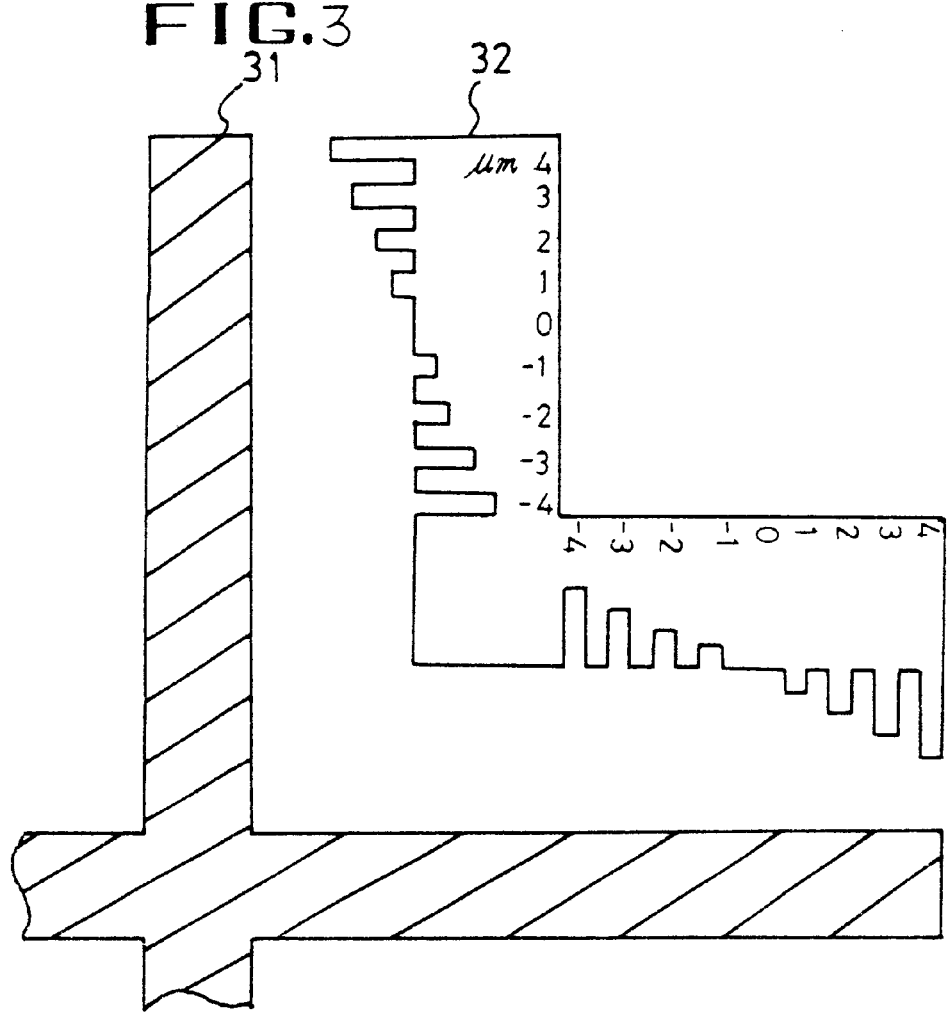
FIG. 3 shows the shapes of the alignment indicators for a LCD according to a preferred embodiment of the present invention.

FIG. 3 shows the shapes of the alignment indicators for a LCD according to a preferred embodiment of the present invention. Referring to FIG. 3, an alignment indicator 31 of the lower substrate, as in the alignment indicator of the related art, preferably has a substantially cross-shaped member having a predetermined width. The alignment indicator 31 of the lower substrate is provided preferably at a corner edge of the lower substrate and preferably defined with an opaque substance such as Al, Cr, Mo and other similar substances that are used for defining a gate or source/drain electrode of TFTs that define the pixel array on the lower substrate.

The alignment indicator 32 of the upper substrate preferably includes four substantially L-shaped members preferably having protruded and recessed portions preferably at the long edges of the substantially L-shaped members. Each of the four substantially L-shaped members preferably has a long edge adjacent to a corresponding long edge of one of the other substantially L-shaped members preferably with a predetermined space between them. The spaces between each of the substantially L-shaped members preferably provide spacing for the substantially cross-shaped member of the lower substrate to be placed within the spacing.

Figure 4:
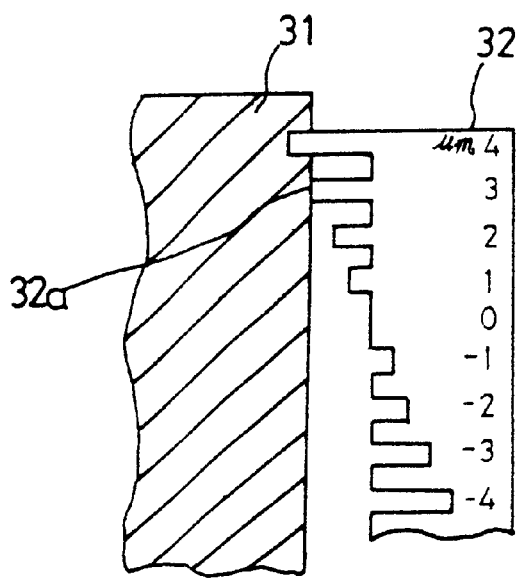
FIG. 4 illustrates how the alignment indicators of FIG. 3 are used to accurately measure the amount of misalignment.

The alignment indicator 32 preferably includes recessed portions having depths that preferably differ from each other and protruded portions which have protruding lengths that preferably differ from each other preferably at the long edges of the alignment indicator 32 of the upper substrate. As shown in FIG. 4, the protruded portions shorten gradually preferably by increments of about 1 μm until the protruded portion has zero length, and the recessed portions deepen gradually also preferably by increments of about 1 μm.

The alignment indicator 32 of the upper substrate in FIG. 3 is provided preferably at a corner edge of the upper substrate and is preferably made of an opaque substance such as Cr and other similar substances that are used for defining a black matrix for a color filter array on the upper substrate.

In the present preferred embodiment, the portions for accurately measuring the amount of misalignment are preferably provided in the alignment indicator 32 of the upper substrate. However, in other preferred embodiments, the measuring portions may be provided in the alignment indicator 31 of the lower substrate.

FIG. 4 illustrates how the alignment indicators of FIG. 3 are used to measure accurately the amount of misalignment. Referring to FIG. 4, when the upper and lower substrates are assembled together, there may be misalignment such that a protruded portion 32a of the alignment indicator 32 extends to a position of the alignment indicator 31. So in this example shown in FIG. 3, the protruded portion 32a of the alignment indicator 32 shows there is an alignment spacing of about 3 μm between the upper and lower substrates. Note that the amount of alignment spacing between the upper and lower substrates is acceptable if the misalignment margin is greater than about 3 μm, while it is unacceptable if the misalignment margin is less than about 3 μm. For example, if the misalignment margin is about 2 μm, misalignment of about 1 μm is apparent from the result of FIG. 4. By accurately measuring the amount of misalignment, process conditions are adjusted to correct the misalignment for manufacture of subsequent panels of a LCD.

Note that in other preferred embodiments of the present invention, the incremental lengths and the maximum lengths of the alignment indicators can be varied. Moreover, other preferred embodiments may have the measuring portions to be provided in the alignment indicator of the lower substrate rather than the upper substrate.

Therefore, the present invention provides improved alignment indicators that allow for accurate measurement of the amount of misalignment without extra equipment or processes. This allows for accurate and precise adjustment of manufacturing conditions during the manufacturing process to make properly aligned LCD panels.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An alignment indicator for an LCD device comprising:
   a first substrate;
   a second substrate;
   a first alignment indicating member including a measuring member defined on the second substrate; wherein the first and second alignment indicating members are arranged such that an amount of misalignment can be measured by a position of the measuring member relative to the first alignment indicating member when the first substrate and the second substrate are assembled together, and the measuring member comprises at least one of recessed portions having various depths and at least one of protruded portions having various lengths.

2. The alignment indicator of claim 1, wherein the second alignment indicating member includes first and second edges that have substantially the same length and are arranged to be substantially perpendicular to each other at a first end of the first and second edges, and wherein the measuring member is defined on at least one of the first and second edges.

3. The alignment indicator of claim 1, wherein the second alignment indicating member includes at least one substantially L-shaped member, wherein the substantially L-shaped member includes first and second outer edges, first and second side edges, and first and second inner edges, wherein the first and second outer edges have substantially the same length and are arranged to be substantially perpendicular to each other at a first end of the first and second outer edges, wherein a first end of the first side edge is arranged perpendicular to a second end of the first outer edge and a first end of the second side edge is arranged to be substantially perpendicular to a second end of t he second outer edge, wherein a first end of the first inner edge is arranged to be substantially perpendicular to a second end of the first side edge and a first end of the second inner edge is arranged to be substantially perpendicular to a second end of the second side edge, and wherein the first and second inner edges are arranged together at a second end of the first and second inner edges.

4. The alignment indicator of claim 3, wherein the second alignment indicating member includes a first, second, third and fourth substantially L-shaped members arranged such that the first outer edge of the first substantially L-shaped member is adjacent to the first outer edge of the second substantially L-shaped member and the second outer edge of the first substantially L-shaped member is adjacent the first outer edge of the fourth substantially L-shaped member and the second outer edge of the second substantially L-shaped member is adjacent the first outer edge of the third substantially L-shaped member and the second outer edge of the third substantially L-shaped member is adjacent to the second outer edge of the fourth substantially L-shaped member, and wherein the four substantially L-shaped members are arranged such that there is an equidistant space between each of the outer edges that are adjacent to each of the other outer edges of the four substantially L-shaped members.

5. The alignment indicator of claim 3, wherein the measuring member is defined on at least one of the first and second outer edges.

6. The alignment indicator of claim 5, wherein the measuring member includes at least one of recessed portions and protruded portions.

7. The alignment indicator of claim 6, wherein the measuring member includes a segment having substantially no recess or protrusion between the recessed portions and the protruded portions.

8. The alignment indicator of claim 7, wherein the protruded portions gradually increase by increments of about 1 μm when proceeding from the segment to the second end of the outer edge, and wherein the recessed portions gradually decrease by increments of about 1 μm when proceeding from the segment to the first end of the outer edge.

9. The alignment indicator of claim 7, wherein the protruded portions gradually increase by increments of about 1 μm when proceeding from the segment to the first end of outer edge, and wherein the recessed portions gradually decrease by increments of about 1 μm when proceeding from the segment to the second end of the outer edge.

10. The alignment indicator of claim 6, wherein the recessed portions decrease gradually by a predetermined increment when proceeding from one end of the outer edge to the other end of the outer edge.

11. The alignment indicator of claim 6, wherein the protruded portions extends gradually by a predetermined increment when proceeding from one end of the outer edge to the other end of the outer edge.

12. The alignment indicator of claim 10, wherein the increment is about 1 μm.

13. The alignment indicator of claim 11, wherein the increment is about 1 μm.

14. The alignment indicator of claim 6, wherein the recessed portions have a maximum depth of about 4 μm and the protruded portions have a maximum length of about 4 μm.

15. The alignment indicator of claim 2, wherein the first alignment indicating member has a substantially cross-shaped member and the second alignment indicating member has four substantially L-shaped members, wherein the four substantially L-shaped members are arranged such that the edges of the substantially L-shaped members are adjacent to the edges of the other substantially L-shaped members, wherein the substantially cross-shaped member can be visually inserted in the middle of the four substantially L shaped figures when the four substantially L-shaped members are placed at each quadrant of the substantially cross-shaped member, and a spacing between each of the adjacent edges of the four substantially L-shaped members is equal.

16. The alignment indicator of claim 1, wherein the first alignment indicating member has a substantially cross-shaped member.

17. The alignment indicator of claim 1, wherein the measurement member includes at least one of recessed portions having depths that gradually decrease by a predetermined increment and protruded portions having lengths that gradually increase by a predetermined increment.

18. The alignment indicator of claim 17, wherein the increment is 1 μm.

19. The alignment indicator of claim 17, wherein the maximum depth of the recessed portions is about 4 μm and the maximum length of the protruded portions is about 4 μm.

20. The alignment indicator of claim 17, wherein the measuring member includes a segment between the recessed portions and the protruded portions where there is substantially zero depth or protrusion.

21. An alignment indicator for a LCD comprising:
    a first substrate;
    a second substrate;
    a first alignment indicating member on the first substrate; and
    a second alignment indicating member on the second substrate, the second alignment indicating member including at least one of a plurality of recessed portions having various depths and a plurality of protruded portions having various lengths, wherein the recessed portions and protruded portions are defined at an edge of the second alignment indicating member, and wherein the relative position of the recessed portions and the protruded portions with respect to the first alignment indicating member provides a measurement of an amount of misalignment between-the first substrate and the second substrate when the first and second substrates are assembled together.

22. The alignment indicator of claim 21, wherein the first alignment indicating member has a substantially cross-shaped member and the second alignment indicating member has at least one substantially L-shaped member, and wherein the recessed portions and the protruded portions are defined on at least a first edge of the substantially L-shaped member.

23. The alignment indicator of claim 21, wherein the first alignment indicating member has at least one substantially L-shaped member and the second alignment indicating member has a substantially cross-shaped member.

24. The alignment indicator of claim 21, wherein the recessed portions have depths that decrease by a predetermined increment and the protruded portions have lengths that increase by a predetermined increment.

25. The alignment indicator of claim 21, wherein the maximum depth of the recessed portion is about 4 μm and the maximum length of the protruded portion is 4 about 4 μm.

26. The alignment indicator of claim 21, wherein the second alignment indicating member includes a segment having substantially no recess or protrusion on the edge thereof.

27. The alignment indicator of claim 21, wherein the second alignment indicating member includes at least one substantially L-shaped member, wherein the at least one substantially L-shaped member includes first and second outer edges, first and second side edges, and first and second inner edges, wherein the first and second outer edges have substantially the same length and are arranged to be substantially perpendicular to each other at a first end of the first and second outer edges, wherein a first end of the first side edge is arranged to be substantially perpendicular to a second end of the first outer edge and a first end of the second side edge is arranged to be substantially perpendicular to a second end of the second outer edge, wherein a first end of the first inner edge is arranged to be substantially perpendicular to a second end of the first side edge and a first end of the second inner edge is arranged to be substantially perpendicular to a second end of the second side edge, and wherein the first and second inner edges are arranged together at a second end of the first and second inner edges.

28. The alignment indicator of claim 27, wherein the recessed and protruded portions are defined on at least one of first and second outer edges.

29. The alignment indicator of claim 23, wherein the recessed and protruded portions are defined on outer edges of the substantially cross-shaped member.

* * * * *